Patented Sept. 14, 1943

2,329,566

UNITED STATES PATENT OFFICE 2,329,566

METHOD OF REFINING POLYMERIZED ROSIN AND POLYMERIZED ROSIN ESTERS

Clell E. Tyler, Hattiesburg, Miss., and Harold R. Monfort, Wilmington, Del., assignors to Hercules Powder Company, Wilmington, Del., a corporation of Delaware No Drawing. Application March 1, 1941, Serial No. 381,384

9 Claims. (Cl. 260—97)

This invention relates to polymerized rosins and polymerized rosin esters and more particularly to a process for the refining of such materials.

The polymerization of rosin and rosin esters with sulfuric acid or organic substituted sulfuric acids has been described in the art. Such catalysts comprise very favorable materials for effecting an increase in melting point of the rosin or rosin ester. Such catalysts, although highly favorable from the above standpoint, suffer the disadvantage of discoloring the rosin or rosin ester to a certain extent and of contaminating the polymerized product with combined sulfur. The known procedures for refining ordinary rosin have not proved satisfactory for refining such sulfuric acid polymerized rosins and rosin esters due principally to the fact that they do not satisfactorily improve the color, because they have a tendency to decrease the melting point of the polymerized product, and particularly because they do not effectively remove all combined sulfur contamination from the polymerized material.

The presence of sulfur in free or combined form in polymerized rosin is particularly disadvantageous in the use of the material in the production of esters, varnishes, gloss oils, metallic salts, etc. and in the use of the polymerized rosin esters in varnishes. It causes appreciable color degradation in the polymerized product during the heating required in preparing such materials from the polymerized rosin or rosin ester. The sulfur at elevated temperatures combines with certain metallic impurities forming colored sulfides and thus in some instances gives rise to very severe color formation. The amount of sulfur which causes these disturbing color phenomena is very small. Thus, a sulfuric acid polymerized rosin having as little as 0.015% of sulfur discolors perceptibly during the heating required to form esters, varnishes, metallic salts, etc. Removal of sulfur down to about this amount has been possible by prior purification procedures, but it has been impossible to go below this amount and therefore to produce a completely satisfactory sulfuric acid polymerized rosin or rosin ester.

It is an object of this invention to provide an improved procedure for refining a polymerized rosin or rosin ester obtained by use of a sulfuric acid type catalyst. It is a further object to provide an improved process of refining such polymerized products which is extremely simple and economical. It is another object to provide a process for refining polymerized rosin obtained by use of a sulfuric acid type catalyst which will provide a refined product of improved color in a substantially quantitative yield based on the polymerized rosin treated. It is a further object to provide as a new composition a sulfuric acid polymerized rosin or rosin ester which will not discolor on heating with metals and which has a sulfur content less than about 0.015%.

The above objects are accomplished in accordance with this invention by subjecting a polymerized rosin or a polymerized rosin ester obtained by use of a sulfuric acid type polymerization catalyst to treatment with molecular hydrogen at a temperature within the range of about 250° to about 325° C. without substantial distillation of the polymerized rosin or rosin ester. By means of such treatment the color of the polymerized product is materially improved and the sulfur impurity is practically entirely eliminated. The refined polymerized rosin or rosin ester is obtained with practically no loss in yield and with substantially no decrease in melting point.

The polymerized rosins or polymerized rosin esters which may be treated by the refining process described in accordance with this invention may be those derived from any of the various grades of wood or gum rosin or esters thereof. They comprise the polymerized rosins or rosin esters obtained with use of a sulfuric acid type polymerization catalyst, for example sulfuric acid, organic substituted sulfuric acids as ethyl sulfuric acid, acetyl sulfuric acid, phenyl sulfuric acid, etc., or acid sludge catalysts formed by treatment of rosin with sulfuric acid such as described in an application, Serial No. 328,864, filed April 10, 1940, by Clell E. Tyler. Catalysts of the above type are broadly interpreted for the purposes of this invention as sulfuric acid type catalysts and all provide polymerized rosins and rosin esters which contain the objectionable and very difficultly removable sulfur impurity.

The polymerized rosin esters which may be treated in accordance with this invention to provide the above-described improvements will include polymerized monohydric as well as polyhydric alcohol esters which have been polymerized by the sulfuric acid type catalysts mentioned above. Thus they will include polymerized forms of the methyl, ethyl, propyl, butyl, ethylene glycol, propylene glycol, diethylene glycol, triethylene glycol, trimethylene glycol, glycerol, pentaerythritol, etc. esters of the various rosins. Alternatively, the process may be carried out on the equivalent esters obtained by esterification of polymerized rosin produced as above with alcohols such as those named above. The polymerization by any of these methods is usually carried out by treatment of the rosin or rosin ester dissolved in some suitable organic solvent.

The polymerized rosins or rosin esters which may be refined in accordance with the above process will be those having a drop melting point from about 5° C. to about 100° C. above the melting point of the original rosin or rosin ester used in the polymerization.

The treatment of polymerized rosin or polymerized rosin esters with molecular hydrogen is preferably performed after the solvent and catalyst have been removed from the polymerized material. The treatment is preferably carried out by heating the polymerized material within the above temperature range and simultaneously passing a stream of molecular hydrogen through the molten material. The velocity of the hydrogen passed through the polymerized rosin or rosin ester will be adjusted so as to prevent any substantial distillation of the polymerized material. The time of treatment necessary to provide the desired refining will depend upon a number of factors such as the particular product being treated, the temperature of treatment, the amount of gas employed, as well as other less important variables. The preferable temperature of treatment will be about 250° to about 280° C. An idea of the time of treatment will be gained from the following illustrations. Thus, for example, with a polymerized rosin obtained by use of an acid sludge catalyst obtained by action of concentrated sulfuric acid on wood rosin, as described in the application, Serial No. 328,864 referred to above, treatment at 250° C. for 15 minutes will provide a material color improvement and will reduce the sulfur content to below 0.010%, whereas at a temperature of 280° C. a time of 10 minutes will give a comparable product with use of the same amount of hydrogen. In general, the time required to provide a satisfactorily refined product will fall within the range of about 5 minutes to about one hour.

The above treatment of polymerized rosins and polymerized rosin esters may be carried out batch-wise or in a continuous manner. In carrying out the treatment continuously the polymerized material to be refined may be passed through a heat exchanger or other suitable device in contact with hydrogen in such a manner as to provide the desired time of contact.

As illustrative of the improved process of refining polymerized rosin or polymerized rosin esters in accordance with this invention, the examples which follow are cited as typical of the various modes of carrying out the invention. Colors shown are expressed either as the color of a ⅞ inch cube according to the U. S. Rosin Color Standards or as the Lovibond glass colors. As a test for effectiveness of sulfur removal, the refined product is heated to 260° C. and 2 per cent of its weight of litharge then added and the heating continued in an inert atmosphere of carbon dioxide or nitrogen to 300° C. and the temperature held at 300° C. for 5 minutes. The color of the cooled product is then determined. With a sulfur content above 0.015% a very pronounced discoloration occurs.

Example I

A polymerized rosin was prepared by the continuous procedure described in the application, Serial No. 328,864, filed April 10, 1940, by Clell E. Tyler involving use of a sludge obtained by treatment of rosin with sulfuric acid as a catalyst. Thus, a 30 per cent solution of K wood rosin in benzol was treated with about 15 per cent its weight of 97 per cent sulfuric acid at a temperature of 15 to 18° C. to form an acid sludge catalyst. A continuous flow of the rosin solution was then contacted with the above acid sludge catalyst at a temperature of 15 to 18° C. at such a rate as to provide contact sufficient to give a polymerized rosin of melting point of about 100° C. The polymerized rosin solution was then heated with one-third its weight of 50% sulfuric acid at 80° C. for one hour to permit water washing without emulsion formation and the polymerized rosin solution then washed with water to remove the sulfuric acid. The benzol was then evaporated under reduced pressure. The color of the resulting product was 40 Amber+5.75 Red. The above polymerized rosin was heated at a temperature of 275° C. for fifteen minutes while at the same time passing a stream of molecular hydrogen through the rosin. The resulting product was of a considerably improved color and showed substantially complete absence of sulfur. The analysis of the polymerized rosin before and after the heat treatment was as follows:

|  | Before | After |
|---|---|---|
| Acid number | 153.5 | 144.5. |
| Melting point (drop) | 100.5° C | 101° C. |
| Color | 40 Amber+5.75 Red | 30 Amber. |
| Sulfur content | 0.025% | 0.008%. |
| Color with 2% litharge | Black | 40 Amber. |

The yield was substantially quantitative.

Example II

The same unrefined polymerized rosin produced as in Example I was heated at 300° C. for 15 minutes and at the same time passing a stream of molecular hydrogen through the rosin. The analysis of the polymerized rosin before and after the hydrogen treatment was as follows:

|  | Before | After |
|---|---|---|
| Acid number | 153.5 | 140. |
| Melting point (drop) | 100.5° C | 101° C. |
| Color | 40 Amber+5.75 Red | 25 Amber. |
| Color with 2% litharge | Black | 27 Amber. |
| Sulfur content | 0.025% | 0.007%. |

Example III

The process of Example II was repeated but with use of a temperature of 265° C. and a time of 25 minutes. The effect of the treatment on color and sulfur content is shown below:

|  | Before | After |
|---|---|---|
| Acid number | 153.5 | 145. |
| Melting point (drop) | 100.5° C | 101° C. |
| Color | 40 Amber+5.75 Red | 32 Amber. |
| Color with 2% litharge | Black | 30 Amber. |
| Sulfur content | 0.025% | 0.012%. |

Example IV

The refined polymerized rosin obtained in Example I was subjected to vacuum distillation at about 1 mm. pressure and with a bath temperature of about 250°–280° C. until approximately 50% of the polymerized rosin had distilled off, leaving a more highly polymerized residue. The residue, amounting to 50% of the original product, had the following analysis:

Acid number_____ 142
Melting point (drop)__degrees centigrate__ 175
Color _____ N
Mol. wt. (Rast)_____ 590 (original rosin 320)
Sulfur_____per cent__ 0.003

*Example V*

A polymerized rosin was prepared by adding 100 parts by weight of 85% sulfuric acid to a solution of 400 parts by weight of WG gum rosin in 140 parts by weight of narrow range gasoline of boiling range 90 to 120° C. with agitation over a period of ½ hour, holding the temperature at 30 to 32° C. The reaction mixture was then poured into 650 parts by weight of the narrow range gasoline with agitation. The gasoline solution was then washed with water to remove the sulfuric acid, and the gasoline evaporated by distillation under reduced pressure. The polymerized rosin obtained was then refined by heating at 300° C. for 30 minutes while at the same time passing a stream of molecular hydrogen into the material without causing distillation of the polymerized rosin. The analysis of the polymerized rosin before and after the refining treatment was as follows:

|  | Before | After |
|---|---|---|
| Acid number | 142 | 135 |
| Melting point (drop)_____°C__ | 120 | 116 |
| Color | WG | X |
| Sulfur_____per cent__ | 0.06 | 0.01 |

*Example VI*

K wood rosin was polymerized by adding 100 parts by weight of crude acetyl sulfuric acid to 500 parts by weight of a 35% solution of K wood rosin in benzene over a period of 10 minutes with agitation, the temperature being held at 15 to 20° C. The agitation was continued for 1¼ hours at 20° C., the solution then allowed to separate and the benzene solution decanted from the sludge. The solution was then washed with water and the solvent evaporated under reduced pressure. The polymerized rosin obtained was heated at 290° C. for 10 minutes while passing a stream of molecular hydrogen into the material. A substantially quantitative yield of refined polymerized rosin resulted. Comparison of the product before and after the heat treatment is shown in the following table:

|  | Before | After |
|---|---|---|
| Acid number | 158 | 149 |
| Melting point (drop)_____°C__ | 96 | 94 |
| Color | I | WG |
| Sulfur_____per cent__ | 0.020 | 0.012 |

*Example VII*

Ester gum was polymerized by adding 100 parts by weight of 95% sulfuric acid to a solution of 300 parts by weight of ester gum in 500 parts by weight of benzene over a 20 minute period with agitation and while maintaining the temperature at 15 to 20° C. The agitation was then continued for 1¼ hours at the same temperature. After allowing the layers to separate, the benzene solution was isolated, washed with water containing a small amount of sodium chloride and the solvent evaporated under reduced pressure. The polymerized ester obtained was refined by heating at 300° C. for 20 minutes while passing molecular hydrogen through the material. The yield was substantially quantitative. The effect of the treatment is shown by the following comparison of the polymerized ester gum before and after the heat treatment:

|  | Before | After |
|---|---|---|
| Acid number | 8 | 4 |
| Melting point (drop)_____°C__ | 118 | 115 |
| Color | I | WG |
| Sulfur_____per cent__ | 0.06 | 0.014 |

The polymerized rosins and rosin esters of improved color and reduced sulfur content obtained in accordance with this invention will be found to be considerably more useful in commercial applications, such as in the production of varnishes, metallic resinates, etc. It is to be understood that the term "refining" used throughout this invention relates particularly to the color improvement and sulfur removal and not necessarily to a separation of the polymerized rosin or rosin ester into light-colored and dark-colored fractions.

It will be understood that the details and examples hereinbefore set forth are illustrative only, and that the invention as broadly described and claimed is in no way limited thereby.

What we claim and desire to protect by Letters Patent is:

1. A method of refining a material selected from the group consisting of polymerized rosin and polymerized rosin esters which have been obtained by polymerization of a rosin or rosin ester with a sulfuric acid type catalyst which includes heating the said polymerized material at a temperature within the range of about 250° C. to about 325° C. and at the same time passing a stream of molecular hydrogen into the said polymerized material without substantial distillation thereof to provide a polymerized material having a substantially decreased sulfur content and having the same number of hydrogen atoms per molecule as the untreated material.

2. A method of refining polymerized rosin obtained by polymerization of a rosin with a sulfuric acid type catalyst which includes heating the said polymerized rosin at a temperature within the range of about 250° C. to about 325° C. and at the same time passing a stream of molecular hydrogen into the said polymerized rosin without substantial distillation thereof to provide a polymerized rosin having a substantially decreased sulfur content and having the same number of hydrogen atoms per molecule as the untreated material.

3. A method of refining polymerized rosin obtained by polymerization of a rosin with an acid sludge catalyst formed by treatment of rosin with sulfuric acid which includes heating the said polymerized rosin at a temperature within the range of about 250° C. to about 325° C. and at the same time passing a stream of molecular hydrogen into the said polymerized rosin without substantial distillation thereof to provide a polymerized rosin having a substantially decreased sulfur content and having the same number of hydrogen atoms per molecule as the untreated material.

4. A method of refining polymerized rosin obtained by polymerization of a rosin with an acid sludge catalyst formed by treatment of rosin with sulfuric acid which includes heating the said polymerized rosin at a temperature within the range of about 250° C. to about 280° C. and at the same time passing a stream of molecular hydrogen into the said polymerized rosin without substantial distillation thereof to provide a polymerized rosin having a substantially decreased sulfur content and having the same number of hydrogen atoms per molecule as the untreated material.

5. A method of refining a polymerized rosin ester obtained by polymerization of a rosin ester with sulfuric acid as a catalyst which includes heating the said polymerized rosin ester at a temperature within the range of about 250° C. to about 325° C. and at the same time passing a stream of molecular hydrogen into the said polymerized rosin without substantial distillation thereof to provide a polymerized rosin ester having a substantially decreased sulfur content and having the same number of hydrogen atoms per molecule as the untreated polymerized rosin ester.

6. A method of refining polymerized rosin obtained by polymerization of a rosin with a sulfuric acid type catalyst which includes heating the said polymerized rosin at a temperature within the range of about 250° C. to about 325° C. for a period of time from about five minutes to about one hour and at the same time passing a stream of molecular hydrogen into the said polymerized rosin without substantial distillation thereof to provide a polymerized rosin having a substantially decreased sulfur content and having the same number of hydrogen atoms per molecule as the untreated material.

7. A method of refining polymerized rosin obtained by polymerization of a rosin with a sulfuric acid type catalyst which includes heating the said polymerized rosin at a temperature within the range of about 250° C. to about 280° C. for a period of time from about five minutes to about one hour and at the same time passing a stream of molecular hydrogen into the said polymerized rosin without substantial distillation thereof to provide a polymerized rosin having a substantially decreased sulfur content and having the same number of hydrogen atoms per molecule as the untreated material.

8. A method of refining polymerized rosin obtained by polymerization of a rosin with an acid sludge catalyst formed by treatment of rosin with sulfuric acid which includes heating the said polymerized rosin at a temperature within the range of about 250° C. to about 325° C. for a period of time from about five minutes to about one hour and at the same time passing a stream of molecular hydrogen into the said polymerized rosin without substantial distillation thereof to provide a polymerized rosin having a substantially decreased sulfur content and having the same number of hydrogen atoms per molecule as the untreated material.

9. A method of refining polymerized rosin obtained by polymerization of a rosin with an acid sludge catalyst formed by treatment of rosin with sulfuric acid which includes heating the said polymerized rosin at a temperature within the range of about 250° C. to about 280° C. for a period of time from about five minutes to about one hour and at the same time passing a stream of molecular hydrogen into the said polymerized rosin without substantial distillation thereof to provide a polymerized rosin having a substantially decreased sulfur content and having the same number of hydrogen atoms per molecule as the untreated material.

CLELL E. TYLER.
HAROLD R. MONFORT.